(12) United States Patent
Jafarpour et al.

(10) Patent No.: US 11,055,629 B2
(45) Date of Patent: Jul. 6, 2021

(54) DETERMINING STABILITY FOR EMBEDDING MODELS

(71) Applicant: Facebook, Inc., Menlo Park, CA (US)

(72) Inventors: Sina Jafarpour, Mountain View, CA (US); Qian Yan, Redwood City, CA (US); Dinkar Jain, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 926 days.

(21) Appl. No.: 15/727,901

(22) Filed: Oct. 9, 2017

(65) Prior Publication Data

US 2019/0108457 A1    Apr. 11, 2019

(51) Int. Cl.
*G06N 20/00* (2019.01)
*G06Q 30/02* (2012.01)

(52) U.S. Cl.
CPC ......... *G06N 20/00* (2019.01); *G06Q 30/0277* (2013.01)

(58) Field of Classification Search
USPC .......................................................... 706/12
See application file for complete search history.

(56) References Cited

U.S. PATENT DOCUMENTS

| | | | | |
|---|---|---|---|---|
| 8,631,044 | B2* | 1/2014 | Jebara | G06Q 30/02 707/798 |
| 9,106,966 | B2* | 8/2015 | Boss | H04N 21/482 |
| 9,117,235 | B2* | 8/2015 | Jebara | G06Q 30/08 |
| 10,394,853 | B2* | 8/2019 | Porter | H04L 51/04 |
| 10,594,689 | B1* | 3/2020 | Weaver | H04L 9/3247 |
| 10,599,731 | B2* | 3/2020 | Zhu | G06F 16/9535 |
| 10,607,312 | B2* | 3/2020 | Li | G06F 21/16 |
| 10,824,607 | B2* | 11/2020 | Xia | G06F 16/9024 |
| 10,891,673 | B1* | 1/2021 | Sawaf | G06Q 30/0643 |
| 10,909,442 | B1* | 2/2021 | Szarvas | G06N 3/04 |
| 2017/0308613 | A1* | 10/2017 | Zhu | G06F 16/9535 |
| 2020/0153901 | A1* | 5/2020 | Bai | G06F 9/45558 |

* cited by examiner

*Primary Examiner* — Michael B Holmes
(74) *Attorney, Agent, or Firm* — Fenwick & West LLP

(57) ABSTRACT

An online system determines a stability metric that indicates overlap between the set of entities associated with a particular entity when embeddings have been adjusted due to modifications in the input data of an embedding model. The online system generates a stability score for the embedding model by computing a statistic for one or more stability metrics. The online system determines a stability metric for a particular content provider by identifying a first cluster of content providers in a set of first embeddings, and a second cluster of content providers in a set of second embeddings. The second embeddings are generated after modifications have been made to input data. The online system determines the stability metric based on an overlap between the first cluster and the second cluster of content providers. The stability score can be an indicator of model performance that can be used to select embedding models.

19 Claims, 4 Drawing Sheets

DETERMINING STABILITY FOR EMBEDDING MODELS

BACKGROUND

This invention relates generally to embedding models, and more particularly to determining stability for embedding models.

Online systems, such as recommendation systems, provide content items associated with a set of content providers to users of the online system. For example, the online system may be a video hosting website that provides users with a collection of videos associated with a set of content providers. The online system may provide content items to users based on predicted affinities between entities of the online system. For example, the video hosting system may predict that a user has a high affinity for baseball videos, and based on that prediction provide the user with a video promoting a baseball glove.

Affinities may be determined by one or more embedding models. Embedding models map entities, such as users and content providers of an online system, to embeddings in a latent space. Affinity between two entities may represent a degree of similarity, or a likelihood that one entity will, for example, interact with the other. Typically, a smaller distance between embeddings indicates higher affinity than a larger distance. For example, an embedding for a user with high affinity for baseball videos may be closer to an embedding for the content provider of the baseball glove marketing video than an embedding for a content provider of a jewelry tutorial video.

Embedding models may be constructed depending on a variety of factors, such as the type of data used to train the model, the set of features of the model, or the architecture of the model. Often times, it is difficult to determine how accurate the estimated affinities are, or how one model performs relative to another. Specifically, affinity between two entities may require human verification that can be a time-consuming task. Although affinity can be evaluated through known evaluation data, there are many other cases in which such data does not exist. For example, although affinity between users and content providers can be evaluated based on known user interaction data, evaluation data for evaluating affinity between content providers themselves may not exist.

SUMMARY

An online system determines a stability metric that indicates overlap between the set of entities associated with a particular entity when embeddings have been adjusted due to modifications in the input data of the embedding model. The online system generates a stability score for the embedding model by computing a statistic with one or more stability metrics. The stability score can be an indicator of embedding model performance that the online system can use to select embedding models. In one embodiment, the modifications to input data are modifications to training data or to feature values of the entities. For example, an embedding for a user may be re-generated when the set of feature values have been updated for the user. A high stability metric indicates that the set of entities remains relatively constant regardless of such modifications in the input data. In one embodiment, the set of entities associated with the particular entity are entities estimated to have high estimated affinities for the particular entity determined based on distances between the embeddings for the entities. In one instance, the set of associated entities correspond to the k-nearest neighbors of the embedding for the particular entity.

In one embodiment, the online system determines stability metrics for entities for which affinity is expected to remain relatively constant over time regardless of modifications in the input data. In one instance, these entities are content providers of an online system that manage a set of content items. Since affinity between these entities are expected to vary insignificantly over time, high stability metrics, and thus, a high stability score for the model indicates a high likelihood that the embedding model is accurately estimating affinity. In this manner, the stability score can provide information on embedding model performance without the need for additional human verification. The online system may then select an embedding model for use that is associated with a high stability score.

In one embodiment, the online system generates a set of first embeddings and a set of second embeddings by an embedding model. The set of second embeddings may be adjusted from the set of first embeddings after modifications have been made to the input data, and may be different from the set of first embeddings. For a particular entity, the online system identifies a first cluster of entities associated with the particular entity in the set of first embeddings. The online system also identifies a second cluster of entities in the set of second embeddings. In one embodiment, the cluster of entities are the k-nearest neighbors of the embedding for the particular entity. The online system determines the stability metric for the particular entity based on the overlap between the first cluster and the second cluster of entities. The online system determines the stability score for the embedding model by computing a statistic based on one or more stability metrics.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Figure 1:
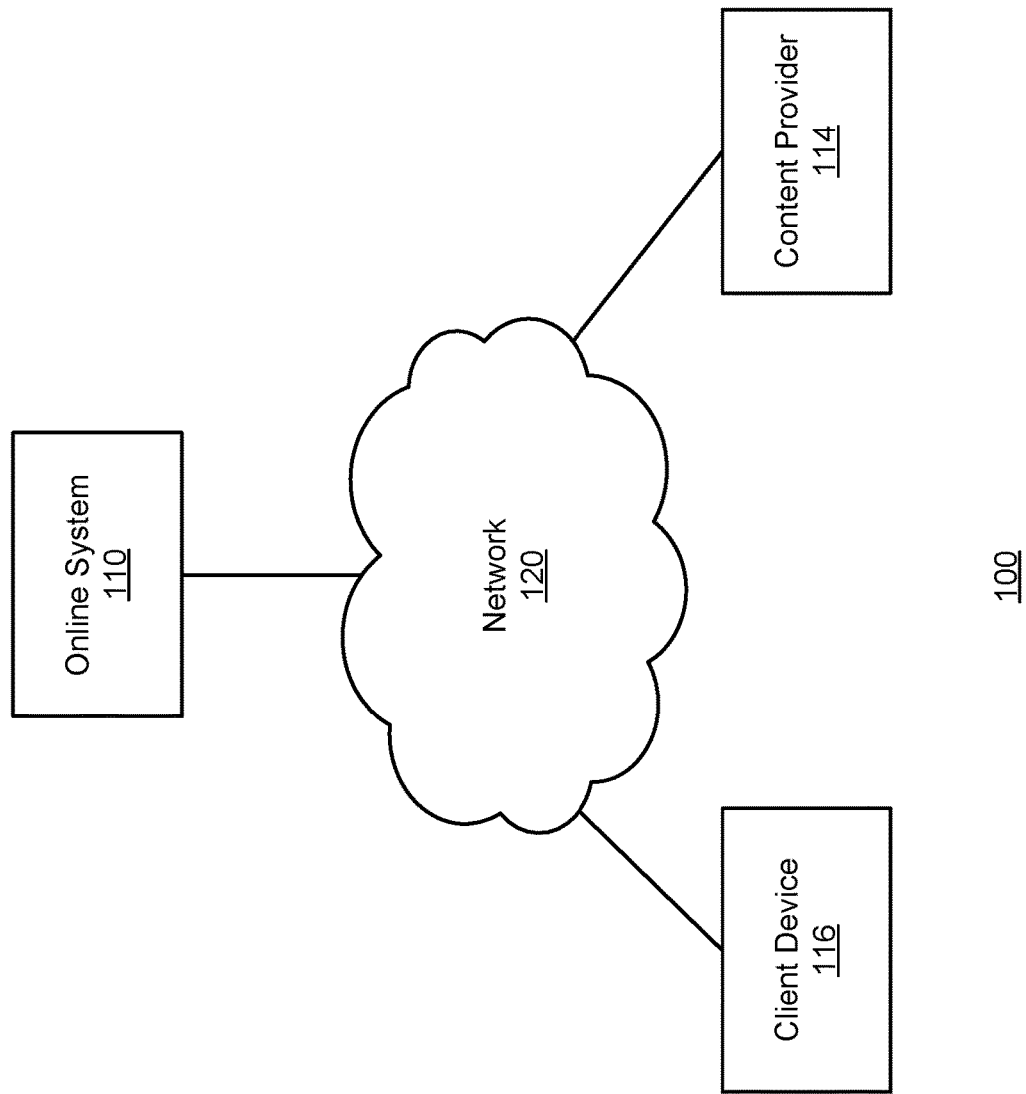
FIG. 1 is a high level block diagram of a system environment for an online system in accordance with an embodiment.

FIG. 1 is a high level block diagram of a system environment 100 for an online system 110 in accordance with an embodiment. The system environment 100 shown by FIG. 1 includes an online system 110, one or more content providers 114, one or more client devices 116, and a network 120. In alternative configurations, different or additional components may be included in the system environment.

The online system 110 provides content items associated with a set of content providers 114 to users of the online system 110. The content items may be for example, video, images, wiki pages, advertisements, and the like. For example, the online system 110 may be a video hosting website that provides users with a collection of videos associated with a set of content providers 114 that produce and distribute videos. For example, a series of jewelry making tutorial videos may be uploaded to the video hosting website by a jewelry business. The online system 110 may provide content items to users based on estimated affinities between entities associated with the online system 110. For example, the video hosting website may predict that a user has a high affinity for baseball videos, and may provide the user with a marketing video promoting a baseball glove.

In one embodiment, the online system 110 estimates affinities from embeddings generated by one or more embedding models. Specifically, embedding models map entities associated with the online system 110, such as users and content providers, to embeddings in a latent space. Affinity between two entities may represent a degree of similarity, or a likelihood that one entity will, for example, interact with the other. Typically, a smaller distance between embeddings indicates higher affinity than a larger distance. For example, an embedding for a user with high affinity for baseball videos may be closer to an embedding for the content provider 114 of the baseball glove marketing video than an embedding for a content provider 114 of a jewelry tutorial video.

In one particular embodiment referred throughout the remainder of the specification, embeddings are generated for users and content providers 114 associated with the online system 110. In such an embodiment, the distance between embeddings of a user and a content provider 114 may represent the degree of user affinity for the content provider 114, and may indicate for example, a likelihood that the user will interact with content items of the content provider 114. The distance between embeddings for content providers 114 may represent similarity between content providers 114, while the distance between embeddings for users may represent similarity between users. However, it is appreciated that in other embodiments, embeddings can be generated for any other type of item, such as content items.

Generally, embeddings are generated based on a set of features and a set of learned parameters associated with the embedding model. The set of features represent entities when input to the model. The set of features may simply indicate the presence of an entity or may include one or more properties that characterize the entity. For example, the set of features for a content provider 114 may include the number of employees and commercial industry of the content provider 114. The set of parameters are learned through training data that contain known instances of interactions between entities. For example, user interaction with a content item may indicate the user has affinity for the content provider 114 of the content item.

The online system 110 may construct one or more embedding models that differ from one another based on, for example, model architecture or the set of features that are input to the model. Often times, it is difficult for the online system 110 to determine how accurate the estimated affinities are, or how one model performs relative to another. Specifically, affinity between two entities may involve human verification, which can be a time-consuming task. Although in some cases, affinity can be evaluated through known evaluation data, there are many other cases in which such data does not exist. For example, although affinity between users and content providers 114 can be evaluated based on known user interaction data, evaluation data for evaluating affinity between content providers 114 themselves may not exist.

In one embodiment, the online system 110 determines a stability metric that indicates overlap between the set of entities associated with a particular entity when embeddings have been adjusted due to modifications in the input data of the embedding model. The online system 110 generates a stability score for the embedding model by computing a statistic for one or more stability metrics. The stability score can be an indicator of embedding model performance that the online system 110 can use to select embedding models. In one embodiment, the modifications to input data are modifications to training data or feature values of the entities. For example, the online system 110 may re-generate an embedding for a user when the set of feature values have been updated for the user. A high stability metric indicates that the set of associated entities remains relatively constant regardless of such modifications in the input data.

In one embodiment, the set of entities associated with the particular entity are entities estimated to have high estimated affinities for the particular entity determined based on distances between the embeddings for the entities. In one instance, the set of associated entities correspond to the k-nearest neighbors of the embedding for the particular entity. As an example, k may be values of 10, 20, 30, or 50. For a given embedding model, the online system 110 may compute a stability score for the embedding model based on stability metrics determined for each content provider 114 or based on a subset of content providers 114.

In one embodiment, the online system 110 determines stability metrics for entities for which affinity is expected to remain relatively constant over time regardless of modifications in the input data. In one instance, these entities are the content providers 114 of the online system 110. Since affinity between these entities are expected to vary insignificantly over time, high stability metrics, and thus, a high stability score for the model indicates a high likelihood that the embedding model is accurately estimating affinity. In other words, a high stability score may indicate that factors such as the architecture of the model or the set of features input to the model are useful in estimating affinities between entities associated with the online system 110.

In this manner, the stability score provides information on embedding model performance without the need for additional human verification. The online system 110 may then select an embedding for use that is associated with a high stability score. For example, the online system 110 may determine stability scores for a set of embedding models that model the same types of entities, and select the embedding model associated with the highest stability score for use. The online system 110 may provide content items to users based on the estimated affinities of the selected embedding model.

Stability metrics may also provide other types of information that the online system 110 can use to target content items. For example, stability metrics may provide information on how particular entities should be grouped together in terms of similarity. For example, a cluster of overlapping entities each associated with a consistently high stability metric may indicate that these entities have a high degree of affinity, and can be grouped together to target content items. The online system 110 may provide a user interested in one entity in the cluster with a content item from another entity in the cluster.

Specifically, the online system 110 generates a set of first embeddings and a set of second embeddings by an embedding model. The set of second embeddings may be adjusted from the set of first embeddings after modifications have been made to the input data, and may be different from the set of first embeddings. For a particular entity, the online system 110 identifies a first cluster of entities associated with the particular entity in the set of first embeddings. The online system 110 also identifies a second cluster of entities in the set of second embeddings. In one embodiment, the cluster of entities are the k-nearest neighbors of the embedding for the particular entity. The online system 110 determines the stability metric for the particular entity based on the overlap between the first cluster and the second cluster of entities. The online system 110 determines the stability score for the embedding model by computing a statistic based on one or more stability metrics.

The content provider 114 produces and manages a set of content items such as videos, images, wiki pages, and advertisements. The content provider 114 provides content items to the online system 110 such that users of the online system 110 can view or interact with the content items. The content items may be used, for example, to promote products, a cause, or other functionalities of the content provider 114. For example, the content provider 114 may be a business organization that provides a social networking system with a series of advertisement items that can be provided to users of the social networking system. As another example, the content provider 114 may be a university that provides a video hosting website with a series of lecture video items that can be accessed by users of the video hosting website.

The client device 116 is a computing device capable of receiving user input as well as communicating via the network 120. While a single client device 116 is illustrated in FIG. 1, in practice many client devices 116 may communicate with the systems in environment 100. In one embodiment, a client device 116 is a conventional computer system, such as a desktop or laptop computer. Alternatively, a client device 116 may be a device having computer functionality, such as a personal digital assistant (PDA), a mobile telephone, a smartphone or another suitable device. A client device 116 is configured to communicate via the network 120.

Users of the online system 110 can interact with the online system 110 through client devices 116. Specifically, a user of a client device 116 may view or interact with content items through the online system 110. For example, a user may view videos on a video hosting system, or click on an advertisement provided by a social networking system. In one embodiment, a client device 116 executes an application allowing a user of the client device 116 to interact with the online system 110. For example, a client device 116 executes a browser application to enable interaction between the client device 116 and the online system 110. In another embodiment, a client device 116 interacts with the online system 110 through an application programming interface (API) running on a native operating system of the client device 110, such as IOS® or ANDROID™.

In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

Figure 2:
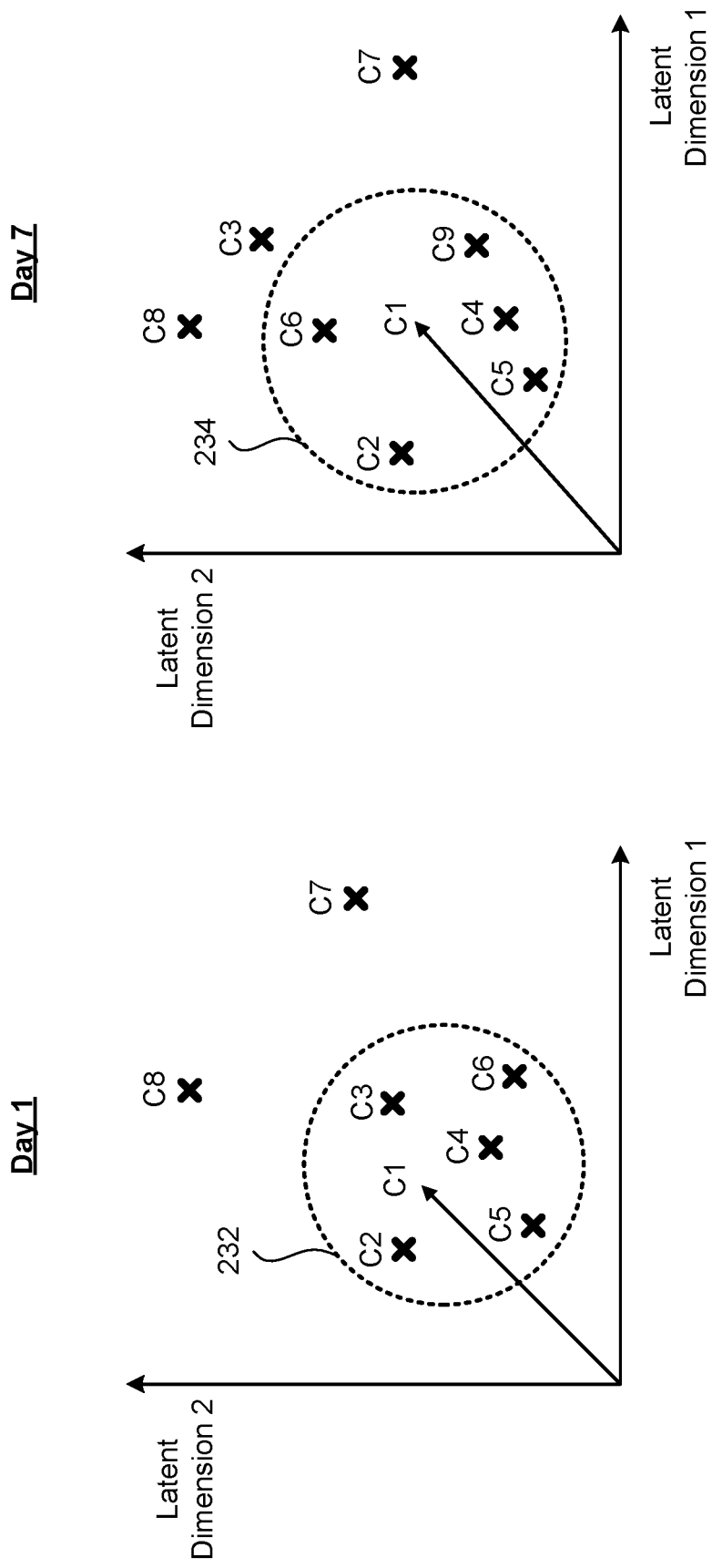
FIG. 2 illustrates an example process of determining stability metrics for a content provider in accordance with an embodiment.

FIG. 2 illustrates an example process of determining a stability metric for a content provider C1 in accordance with an embodiment. On day 1, the online system 110 generates a set of first embeddings using an embedding model for a set of content providers 114. The embeddings span latent space 1 and latent space 2. Specifically, embeddings for content providers C1, C2, C3, C4, C5, C6, C7, and C8 are labeled in the space shown in FIG. 2. On day 7, the online system 110 generates a set of second embeddings using the embedding model for the set of content providers 114. The set of second embeddings are adjusted from the set of first embeddings due to modifications in the input data. For example, the embedding model may be re-trained with updated training data that include user interactions occurring between day 1 and day 7.

The online system 110 determines the stability metric for content provider C1 based on the set of first and second embeddings. Specifically, the online system 110 identifies a first cluster 232 of content providers 114 in the set of first embeddings. In the example shown in FIG. 2, the cluster 232 includes the five nearest-neighbors C2, C3, C4, C5, and C6 to the embedding for content provider C1. The online system 110 also identifies a second cluster 234 of content providers 114 in the set of second embeddings. Due to modifications in the input data from day 1 to day 7, the cluster 234 now includes a different set of nearest-neighbors C2, C4, C5, C6, and C9. The online system 110 determines the stability metric for content provider C1 based on the overlap between the first cluster 232 and the second cluster 234. In the example shown in FIG. 2, content providers C2, C4, C5, and C6 overlap between the first cluster 232 and the second cluster 234. Thus, the stability metric may be given by $4/5=0.8$.

Figure 3:
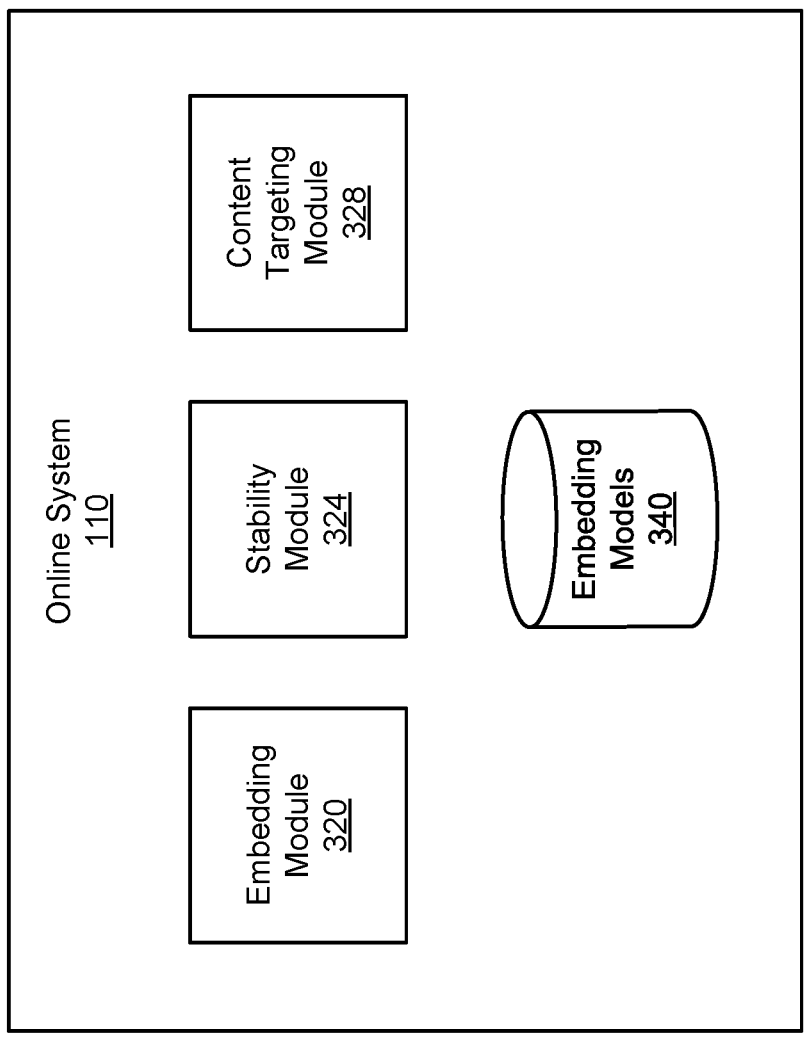
FIG. 3 is a block diagram of an architecture of an online system in accordance with an embodiment.

FIG. 3 is an example block diagram of an architecture of the online system 110 in accordance with an embodiment. In the embodiment shown in FIG. 3, the online system 110 includes an embedding module 320, a stability module 324, and a content targeting module 328. The online system 110 also includes an embedding models 340 data store. Some embodiments of the online system 110 have different components than those described in conjunction with FIG. 3. Similarly, the functions further described below may be distributed among components of the online system 110 in a different manner than is described here.

The embedding module 320 constructs one or more embedding models that model affinity between entities associated with the online system 110. In one embodiment, the embedding model 320 is a neural network model, in which a series of linear or non-linear transformations are applied to the input data as the input data propagates through one or more layers of the network. For each embedding model, the online system 110 identifies the architecture of the model, a set of features that are input to the model, and training data that can be used to learn affinities between entities. The embedding models, as well as the embeddings are stored in the embedding models store 340.

Specifically, the set of features characterize how an entity is represented when input to the model. In one embodiment, the embedding module 320 encodes the set of features to simply indicate the presence of the entity associated with the online system 110. In such an embodiment, the set of features may be a one-hot encoded vector in which the number of elements correspond to the number of entities associated with the online system 110. Only the element corresponding to the entity has a non-zero value. For example, the embedding module 320 may encode content provider A as [0 0 1 0], where the third element of the vector corresponds to content provider A, and the remaining elements correspond to other content providers. In another embodiment, the embedding module 320 encodes the set of features to include one or more properties that characterize the entity. For example, the set of features for a user of the online system 110 may indicate the age of the user, the gender of the user, and the types of content items the user has previously accessed.

The training data are known instances of interactions between entities that can be used to learn affinities between entities. For example, each instance in the training data may include a user and a content provider 114 that the user has interacted with through, for example, accessing content items of the content provider 114. The embedding module 320 may determine parameters of the embedding model through minimizing the difference between model output and known output for instances in training data. Thus, the learned affinity relationships between entities may be embedded in the parameters for the model.

In one embodiment, the embedding module 320 regularly performs updates to the model to incorporate modifications to input data. The modifications to input data may be updates to training data or updates to feature values for entities associated with the online system 110. For example, the embedding module 320 may re-train embedding models when new training data becomes available. The embeddings for entities may be adjusted according to the new data. As another example, the embedding module 320 may re-generate embeddings for a content provider 114 when the set of features for the content provider 114 are updated.

The stability module 324 determines stability metrics for embedding models. Specifically, for an embedding model, the stability module 324 generates a set of first embeddings and a set of second embeddings by the embedding model. The set of second embeddings may be generated after modifications have been made to the input data, and may be different from the set of first embeddings. For a particular entity, the stability module 324 identifies a first cluster of entities associated with the particular entity in the set of first embeddings. The stability module 324 also identifies a second cluster of entities in the set of second embeddings. In one embodiment, the cluster of entities are the k-nearest neighbors of the embedding for the particular entity. The stability module 324 determines the stability metric for the particular entity based on the overlap between the first cluster and the second cluster of entities. In one embodiment, the stability metric is given by the number of overlapping entities n divided by the number of nearest-neighbors k (n/k).

The stability module 324 determines stability scores for embedding models based on the determined stability metrics. Specifically, the stability module 324 may determine stability scores for different types of embedding models 340, and flag an embedding model for use based on the determined stability scores. In one embodiment, the stability score is a statistic of one or more stability metrics, such as the average, median, or the inverse of the variance of the stability metrics. For example, the stability score may be the average of stability metrics determined for each of the set of content providers 114. The stability module 324 may flag the embedding model with the highest stability score for use by other modules of the online system 110. As another example, the stability module 324 may determine multiple stability scores for an embedding model that each correspond to different subsets of content providers 114. The stability module 324 may flag the embedding model with the highest stability score for each subset. For example, the stability module 324 may determine stability scores for a subset of content providers 114 associated with the online education industry, and flag the embedding model with the highest stability score for the subset.

The content targeting module 328 provides content items to users based on affinities estimated by one or more embedding models. For example, the content targeting module 328 may select and provide an advertisement to a user based on the user's high affinity for the content provider 114 of the advertisement. As another example, the content targeting module 328 may recommend a list of video items to a user based on the user's affinity for certain video content providers. In one embodiment, the content targeting module 328 provides content items to users using the embedding models flagged by the stability module 324. For example, the content targeting module 328 may determine which content items to provide to a user based on embeddings generated by the embedding model with the highest stability score.

In one embodiment, the content targeting module 328 identifies groups of entities that share similar characteristics with one another, and provides content items to users based on the identified groups. For example, the content targeting module 328 may identify groups of content providers 114 according to industries of the content providers 114. The content targeting module 328 may identify a user with high affinity for a content provider 114 of a particular group, and provide the user with content items from another content provider 114 in the same group. In one embodiment, the content targeting module 328 identifies groups of entities based on stability metrics determined by the stability module 324. For example, a cluster of entities associated with a consistently high stability metric over time may indicate that these entities have significant similarities with one another, and can be grouped together to target content items.

Figure 4:
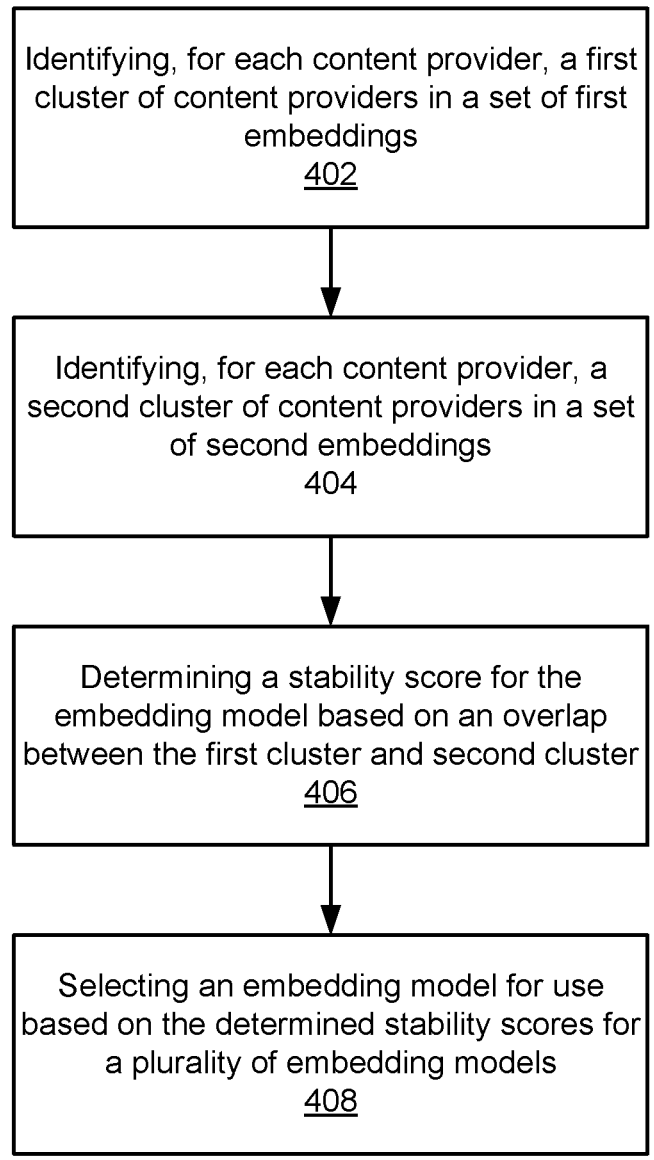
FIG. 4 is a flowchart illustrating a process of selecting an embedding model for use in accordance with an embodiment.

FIG. 4 is a flowchart illustrating a process of selecting an embedding model for use in accordance with an embodiment. The online system determines stability scores for a plurality of embedding models. Specifically, the online system identifies 402 a first cluster of content providers in a set of first embeddings generated by an embedding model. The online system identifies 404 a second cluster of content providers in a set of second embeddings. The set of second embeddings are generated by the embedding model after modifications in the input data. The online system determines 406 a stability score for the embedding model based on an overlap between the first cluster of content providers and the second cluster of content providers. The online system selects 408 an embedding for use based on the determined stability scores for the plurality of embedding models.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    determining, for each embedding model in a plurality of embedding models, a stability score for the embedding model, comprising:
        identifying, for each content provider of a set of content providers, a first cluster of content providers associated with the content provider in a set of first embeddings generated by the embedding model, wherein the set of first embeddings are generated based on first input data, and wherein the first cluster of content providers are determined based on distances between the first embeddings;
        identifying, for each content provider, a second cluster of content providers associated with the content provider in a set of second embeddings generated by the embedding model, wherein the set of second embeddings are generated based on second input data different from the first input data, and wherein the second cluster of content providers are determined based on distances between the second embeddings; and
        determining the stability score for the embedding model based on an overlap between the first cluster of content providers and the second cluster of content providers for one or more content providers; and
    selecting an embedding model for use based on the determined stability scores for the plurality of embedding models.

2. The method of claim 1, wherein the first input data and the second input data correspond to values for a set of features for the set of content providers.

3. The method of claim 1, wherein the first input data and the second input data correspond to training data for learning one or more parameters of the embedding model.

4. The method of claim 1, further comprising providing one or more content items to users of the online system based on embeddings generated by the selected embedding model.

5. The method of claim 1, wherein determining the stability score further comprises:
    determining, for each of the one or more content providers, a stability metric based on an overlap between the first cluster of content providers and the second cluster of content providers; and
    determining the stability score by computing a statistic of the stability metrics for the one or more content providers.

6. The method of claim 5, wherein the statistic is an average, a median, or an inverse of variance of the stability metrics for the one or more content providers.

7. The method of claim 5, wherein the first cluster of content providers correspond to k-nearest neighbors of a first embedding of the content provider, and the second cluster of content providers correspond to k-nearest neighbors of a second embedding of the content provider.

8. The method of claim 7, wherein the overlap between the first cluster of content providers and the second cluster of content providers is computed by a number of common content providers in the first cluster of content provider and the second cluster of content providers divided by k.

9. The method of claim 1, wherein the one or more content providers are a subset of the set of content providers, and share at least one common characteristic with one another.

10. A method comprising:
    determining, for each embedding model of one or more embedding models, a stability score for the embedding model, comprising:
        identifying, for each content provider of a set of content providers, a first cluster of content providers associated with the content provider in a set of first embeddings generated by the embedding model, wherein the set of first embeddings are generated based on first input data, and wherein the first cluster of content providers are determined based on distances between the first embeddings;
        identifying, for each content provider, a second cluster of content providers associated with the content provider in a set of second embeddings generated by the embedding model, wherein the set of second embeddings are generated based on second input data different from the first input data, and wherein the second cluster of content providers are determined based on distances between the second embeddings; and determining the stability score for the embedding model based on an overlap between the first cluster of content providers and the second cluster of content providers for one or more content providers.

11. The method of claim 10, wherein the first input data and the second input data correspond to values for a set of features for the set of content providers.

12. The method of claim 10, wherein the first input data and the second input data correspond to training data for learning one or more parameters of the embedding model.

13. The method of claim 10, further comprising providing one or more content items to users of the online system based on the stability scores determined for the one or more embedding models.

14. The method of claim 13, wherein providing the one or more content items comprises providing the one or more content items to users of the online system based on embeddings generated by an embedding model associated with a highest stability score.

15. The method of claim 10, wherein determining the stability score further comprises:

determining, for each of the one or more content providers, a stability metric based on an overlap between the first cluster of content providers and the second cluster of content providers of the content provider; and determining the stability score by computing a statistic of the stability metrics for the one or more content providers.

16. The method of claim 15, wherein the statistic is an average, a median, or an inverse of variance of the stability metrics for the one or more content providers.

17. The method of claim 15, wherein the first cluster of content providers correspond to k-nearest neighbors of a first embedding of the content provider, and the second cluster of content providers correspond to k-nearest neighbors of a second embedding of the content provider.

18. The method of claim 17, wherein the overlap between the first cluster of content providers and the second cluster of content providers is computed by a number of common content providers in the first cluster of content provider and the second cluster of content providers divided by k.

19. The method of claim 10, wherein the one or more content providers are a subset of the set of content providers, and share at least one common characteristic with one another.

* * * * *